(12) United States Patent
Loukianov

(10) Patent No.: US 6,715,075 B1
(45) Date of Patent: Mar. 30, 2004

(54) PROVIDING A CONFIGURATION FILE TO A COMMUNICATION DEVICE

(75) Inventor: Dmitrii Loukianov, Chandler, AZ (US)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 09/349,870

(22) Filed: Jul. 8, 1999

(51) Int. Cl.[7] .............................................. G06F 13/00
(52) U.S. Cl. ...................... 713/176; 714/200; 714/201; 714/155; 709/219; 709/220; 380/258
(58) Field of Search ................................ 713/201, 200, 713/202, 155, 150, 176; 380/258; 709/223, 220, 250, 227, 215, 229, 222, 217

(56) References Cited

U.S. PATENT DOCUMENTS

| | | | | |
|---|---|---|---|---|
| 5,801,856 A | * | 9/1998 | Moghadam et al. | 358/527 |
| 5,825,884 A | * | 10/1998 | Zdepski et al. | 705/78 |
| 5,898,779 A | * | 4/1999 | Squilla et al. | 713/176 |
| 6,012,088 A | * | 1/2000 | Li et al. | 709/219 |
| 6,012,100 A | * | 1/2000 | Frailong et al. | 709/250 |
| 6,049,787 A | * | 4/2000 | Takahashi et al. | 705/44 |
| 6,230,326 B1 | * | 5/2001 | Unger et al. | 725/111 |
| 6,233,687 B1 | * | 5/2001 | White | 713/201 |
| 6,256,739 B1 | * | 7/2001 | Skopp et al. | 713/201 |
| 6,317,790 B1 | * | 11/2001 | Bowker et al. | 709/225 |
| 6,336,114 B1 | * | 1/2002 | Garrison | 707/9 |
| 6,470,448 B1 | * | 10/2002 | Kuroda et al. | 713/176 |
| 6,598,057 B1 | * | 7/2003 | Synnestvedt et al. | 707/200 |

OTHER PUBLICATIONS

Cable Television Laboratories, Inc., 1999, "Data–Over–Cable Service Interface Specification," Radio Frequency Interface Specification, SP–RFIv1.1–I01–990311, p. i–310.

* cited by examiner

Primary Examiner—Ly V. Hua
(74) Attorney, Agent, or Firm—Fish & Richardson P.C.

(57) ABSTRACT

A configuration file is provided to a communication device. Identification information associated with the communication device is received and configuration information is retrieved from a database based on the identification information. A configuration file is generated from the configuration information and provided to the communication device.

30 Claims, 4 Drawing Sheets

PROVIDING A CONFIGURATION FILE TO A COMMUNICATION DEVICE

BACKGROUND OF THE INVENTION

This invention relates to providing a configuration file to a communication device such as a modem.

In the case of a cable modem that couples cable television ("CATV") cable to a personal computer ("PC"), for example, a configuration file is sent on the cable from a cable modem termination system ("CMTS") to the cable modem. The configuration file includes configuration information that defines the modem's access to services on the cable network, such as an amount of bandwidth that will be available to the modem.

SUMMARY OF THE INVENTION

In general, in one aspect of the invention, a configuration file is provided to a communication device. Identification information associated with the communication device is received and configuration information is retrieved from a database based on the identification information. A configuration file is generated from the configuration information and it is then provided to the communication device.

Among the advantages of the invention may be one or more of the following. The configuration file can be custom-tailored rather than using an existing file. Consequently, there is less chance that the communication device will receive the wrong configuration file. Authentication may also be included to further reduce the chances that the wrong configuration file will be received.

Other features and advantages of the invention will become apparent from the following description and the claims.

DESCRIPTION

Figure 1:
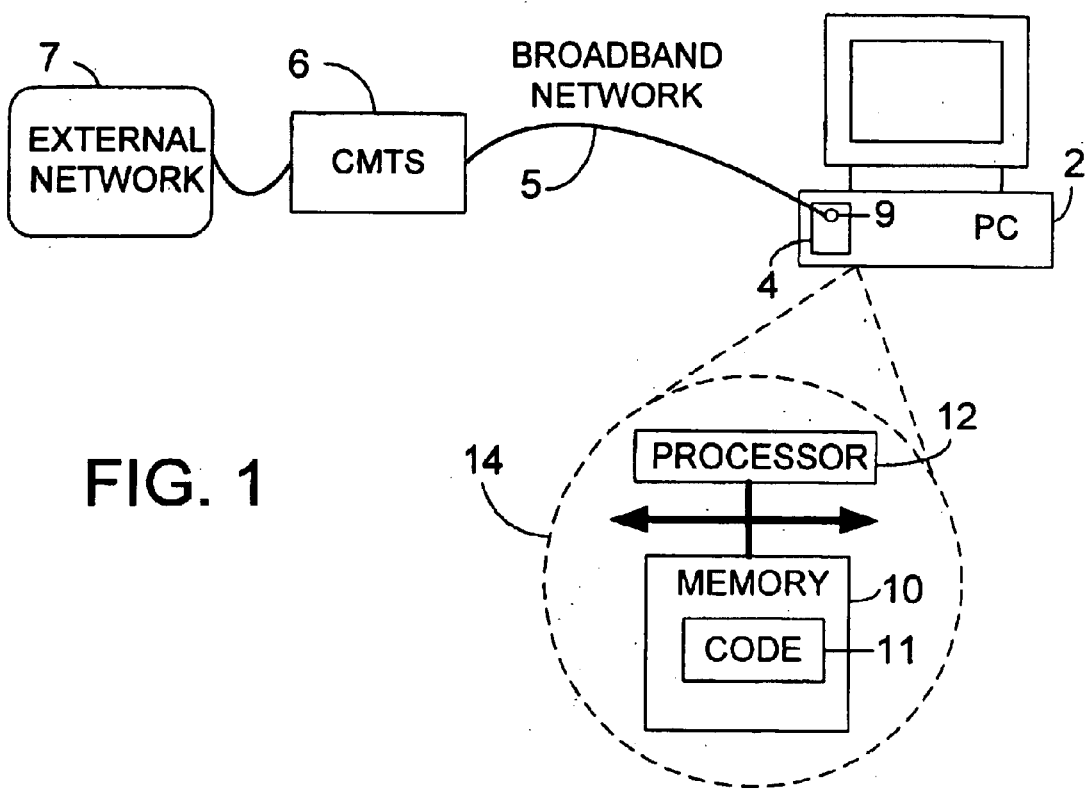
FIG. 1 shows a network system according to one embodiment of the invention.

FIG. 1 shows a network system 1. Network system 1 includes processing device 2, modem 4, broadband network 5, CMTS 6, and external network 7 such as the Internet.

Broadband network 5 is an existing CATV cable network with connections to CMTS 6 and subscribers' homes (not shown). Hybrid fiber coaxial cable ("HFC") is the primary physical transmission medium of broadband network 5. Signals run in standard fiber-optic cables from a central location such as CMTS 6 to locations near the subscriber. From there, standard coaxial cables run into the subscribers' homes.

In one embodiment, modem 4 is a DOCSIS ("Data-Over-Cable Service Interface Specifications") compliant cable modem (see "Data-Over-Cable Interface Specifications: Radio Frequency Interface Specification", SP-RFIv1.1-I01-990311 (Mar. 11, 1999)). Modem 4 includes a standard coaxial receptacle 9 for interfacing to broadband network 5. Through this interface, modem 4 transmits data from processing device 2 to broadband network 5 (upstream) and from broadband network 5 to processing device 2 (downstream). In FIG. 1, modem 4 is a PCI ("Peripheral Component Interconnect") bus add-in card on processing device 2; however a stand-alone modem with a local processor may be used instead.

Processing device 2 includes a processor 12 and a memory 10 for storing code 11 (see view 14). Examples of processing devices are a personal computer ("PC") (depicted), a settop box, and a digital television. Processor 12 executes code 11 to communicate with modem 4, to include cryptographic certificate(s) in requests sent from modem 4 (see below), and to generate digital signatures for the certificates. A digital signature is created by generating a hash value of a certificate's body (e.g., text) and encrypting the hash using the modem's private key. In a stand-alone modem, these functions may be performed in the modem itself.

Figure 2:
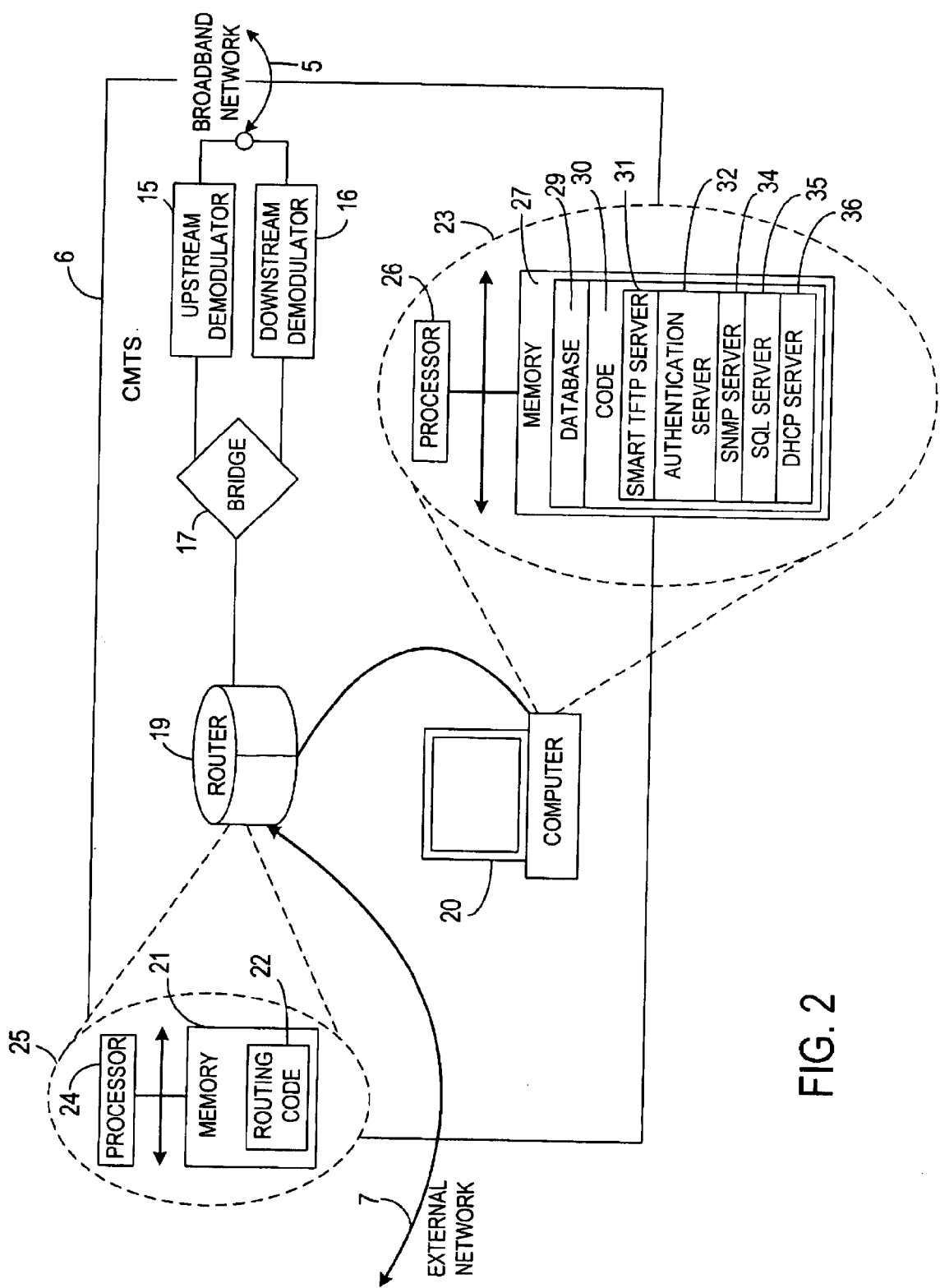
FIG. 2 shows an architecture of a CMTS according to one embodiment of the invention.

CMTS 6 interfaces external network 7 to broadband network 5 and thus to cable modems on broadband network 5. CMTS is usually controlled by a CATV company, which also controls the broadband network. FIG. 2 shows the architecture of CMTS 6.

CMTS 6 includes upstream demodulator 15, downstream modulator 16, and router 19. Computer 20 is shown as external to CMTS 6, though it may be internal as well. Upstream demodulator 15 mediates data flow from broadband network 5 to router 19; and downstream modulator 16 mediates data flow from router 19 to broadband network 5. Router 19 routes data packets among upstream demodulator 15, downstream modulator 16, computer 20, and external network 7. Router 19 includes a memory 21 which stores routing code 22 and a processor 24 which executes the routing code (see view 25).

Computer 20 includes a processor 26 and a memory 27 (see view 23). Memory 27 stores a database 29 which, if necessary, can span several computers. Database 29 includes configuration information for modem 4 and other modems on broadband network 5. This configuration information can be compiled manually or through an "on-line sign-up sheet" such as an HTML ("HyperText Mark-up Language") form that is filled-out by a user during a first connection of a modem to broadband network 5. In database 29, configuration parameters are indexed to identification information for a corresponding modem. This identification information may be the IP ("Internet Protocol") address or the MAC ("Media Access Control") address of the modem, or any other type of identification information such as information contained in a digital certificate.

The configuration information in database 29 describes the services that a modem is entitled to, and is sufficient to allow the modem to connect to, and operate on, the network. It includes one or more of the following for each modem on the broadband network 5: network access configuration setting, DOCSIS 1.0 class of service configuration setting, upstream service flow configuration setting, downstream service flow configuration setting, downstream frequency configuration setting, upstream channel ID ("IDentifier") configuration setting, baseline privacy configuration setting, software upgrade file name configuration setting, upstream packet classification setting, SNMP ("Simple Network Management Protocol") write-access control, SNMP MIB ("Management Information Base") object, software server IP address, CPE ("Customer Premise Equipment") Ethernet MAC address, maximum number of CPEs, maximum number of classifiers, privacy enable configuration setting, payload header suppression, TFTP ("Trivial File Transfer Protocol") server timestamp, TFTP server provisioned modem address, pad configuration settings, telephone settings options, and vendor-specific configuration settings. DOCSIS 1.0 class of service configuration setting, upstream service flow configuration setting, and downstream service flow configuration setting specify amounts of bandwidth allocated to modem 4 on broadband network 5.

Memory 27 also stores code 30, which is comprised of instructions for execution by processor 26. Code 30 includes smart TFTP server 31, authentication server 32, SNMP manager 34, SQL ("Simple Querying Language") server 35, and DHCP ("Dynamic Host Configuration Protocol") server 36. SNMP manager 34 is provided for IP-based modem-network management. SQL server 35 manages access to database 29. Authentication server 32 verifies that requests for a configuration file from modem 4 actually did originate from modem 4. DHCP server 36 provides an address and the modem's configuration file name to smart TFTP server 31. Smart TFTP server 31 generates a configuration file for modem 4 from configuration information in database 29 and protects its content by generating a message integrity checksum which is embedded in the file. Smart TFTP server 31 then provides that configuration file to modem 4.

Figure 3:
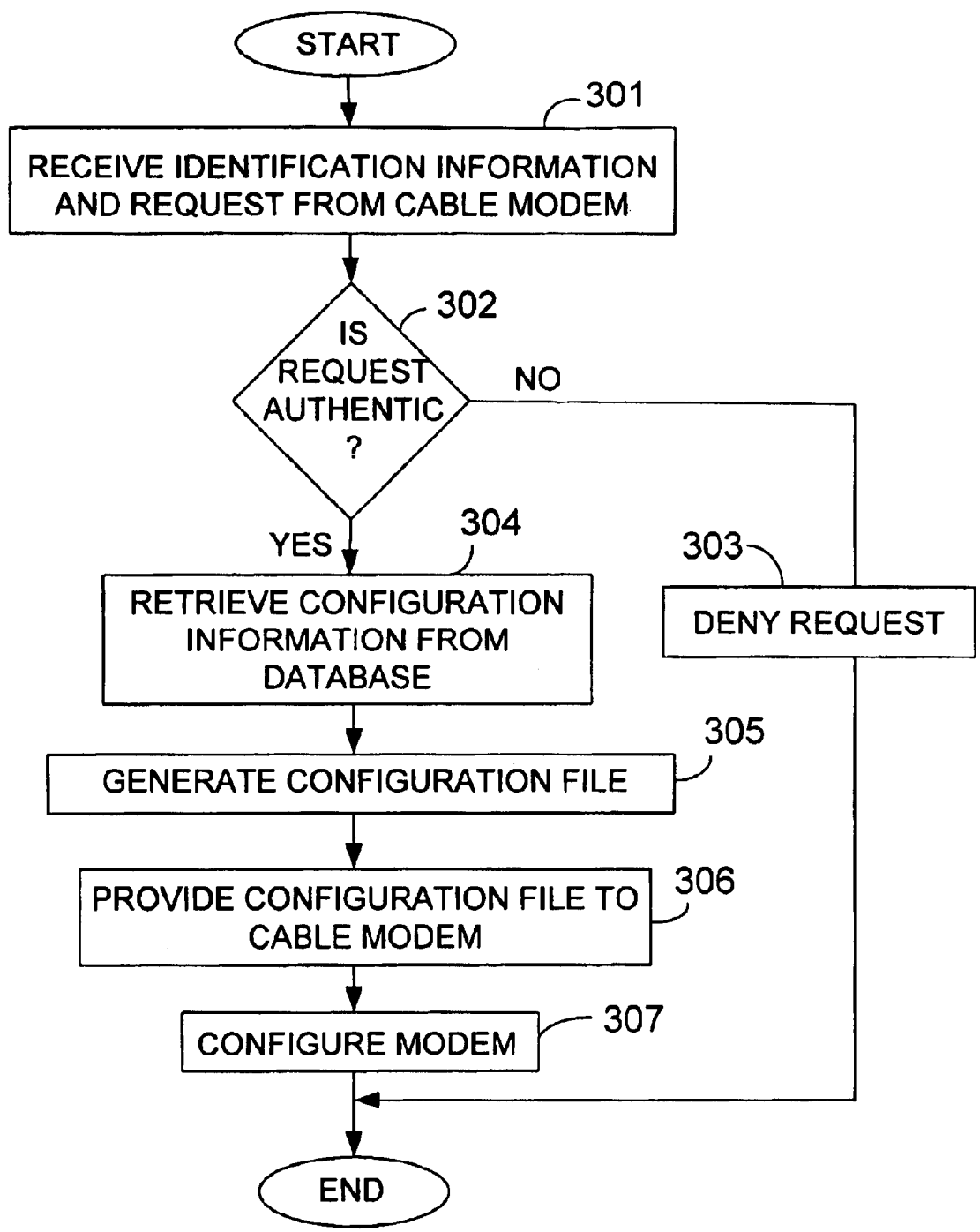
FIG. 3 shows a process for providing a configuration file to a communication device according to one embodiment of the invention.

FIG. 3 shows a process for providing a configuration file to modem 4 using code 30. To begin, modem 4 issues a standard TFTP request for a configuration file to CMTS 6. This may be done when modem 4 is first connected to broadband network 5 or at a subsequent re-initialization. CMTS 6 receives the request in 301 and routes the request through upstream demodulator 15 and router 19 to computer 20, where the request is processed.

The request includes minimum identification information for modem 4, such as modem 4's source IP address and maybe its MAC address (for example, if smart TFTP server 31 is implemented on router 19 and the source MAC address is available). A standard TFTP request does not contain authentication information. Therefore, an additional mechanism is used for authentication.

More specifically, smart TFTP server 31 issues an SNMP query to modem 4 requesting authentication information. The SNMP query is addressed using modem 4's address in its original TFTP request. The SNMP query can be issued directly, or through SNMP manager 34. Modem 4 replies to the SNMP query with a certificate containing authentication information, which can be verified by authentication server 32, and then used to reference information in database 29 by issuing an SQL query to SQL server 35. The certificate may be an ITU (International Telecommunication Union) X.509 standard certificate.

Alternatively, a request for authentication information may be made through DOCSIS Baseline Privacy Plus ("BPI+") MAC messaging. To do this, smart TFTP server 31 accesses a MAC messaging mechanism in CMTS 6. This can be done by encapsulating MAC messages in IP protocol frames.

Regardless of the communication method, once modem 4 supplies the certificate, it may be checked internally in smart TFTP server 31 or presented to authentication server 32 for verification. The certificate is encrypted, and contains a body, which may be plain text or the like, and a digital signature. The digital signature is generated by hashing the contents of the body using a standard hashing algorithm, such as MD5 (Message Digest 5).

Figure 4:
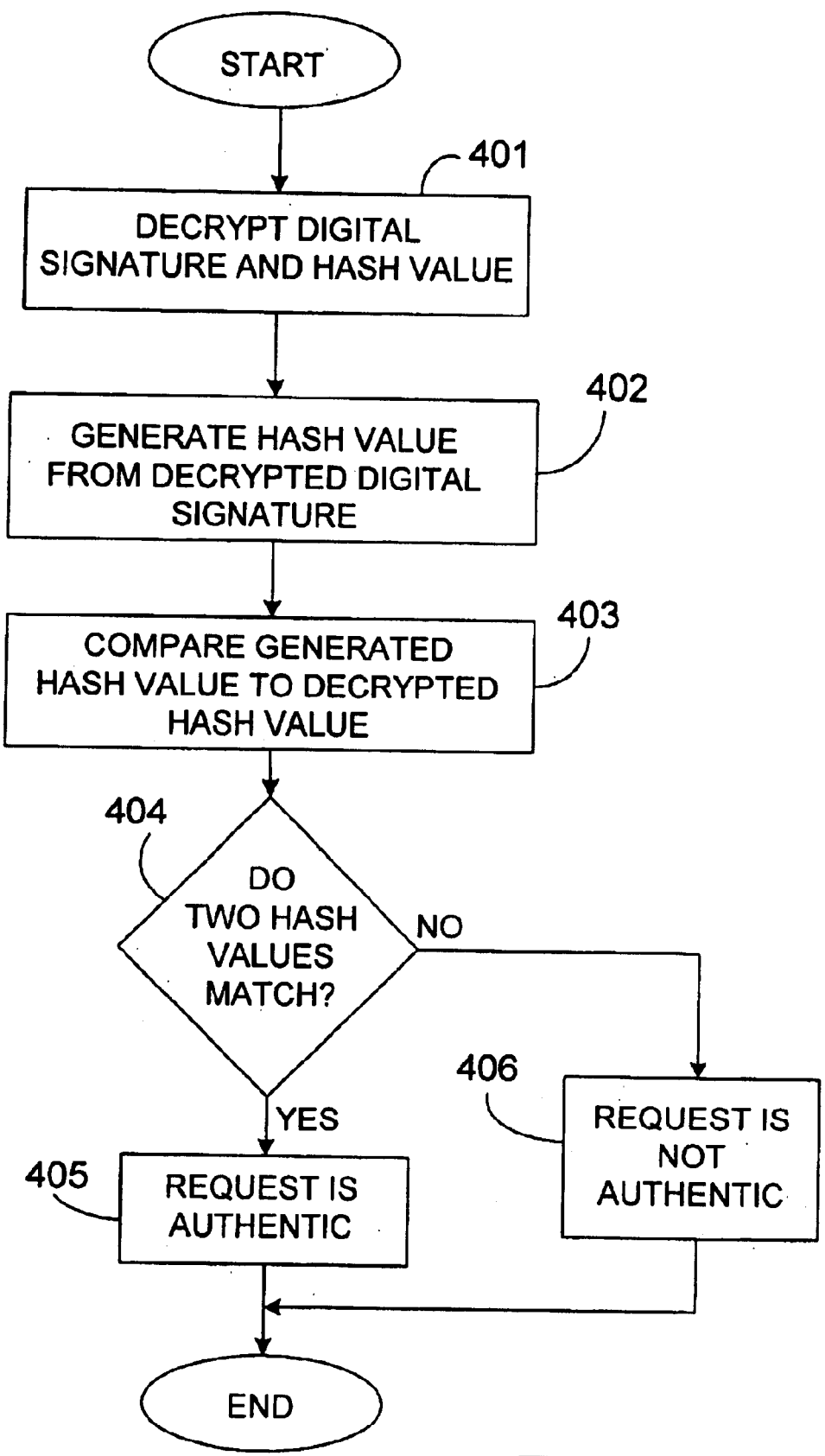
FIG. 4 shows a process for authenticating a request for a configuration file according to one embodiment of the invention.

Authentication server 32 determines if the request is authentic 302, meaning that it actually originated from modem 4, based on the authentication information in the certificate. FIG. 4 shows an authentication process.

To begin, authentication server 32 decrypts 401 the certificate using a public key that corresponds to the private key used for encryption. It then independently generates 402 a hash value from the body of the certificate. This generated hash value is compared 403 to the decrypted digital signature (hash value). If there is a match in 404, the request is deemed authentic in 405. Otherwise, the request is deemed not to be authentic in 406.

As an alternative to the FIG. 4 process, authentication server 32 may simply instruct SQL server 35 to locate, in database 29, an identifier of modem 4, such as its IP address, serial number, or MAC address. If the identifier is located, the request is deemed authentic, otherwise it is not. If database 29 indexes configuration information by MAC address, authentication of this type requires a mapping between the modem's MAC and IP addresses.

Returning to FIG. 3, if authentication server 32 determines that the request is not authentic, smart TFTP server 31 denies 303 the request. Denial may mean simply ignoring the request or instructing SNMP server 35 to issue a message indicating that the request has been denied. If the request is authentic, smart TFTP server 31 retrieves 304 configuration information for modem 4 from database 29.

Figure 5:
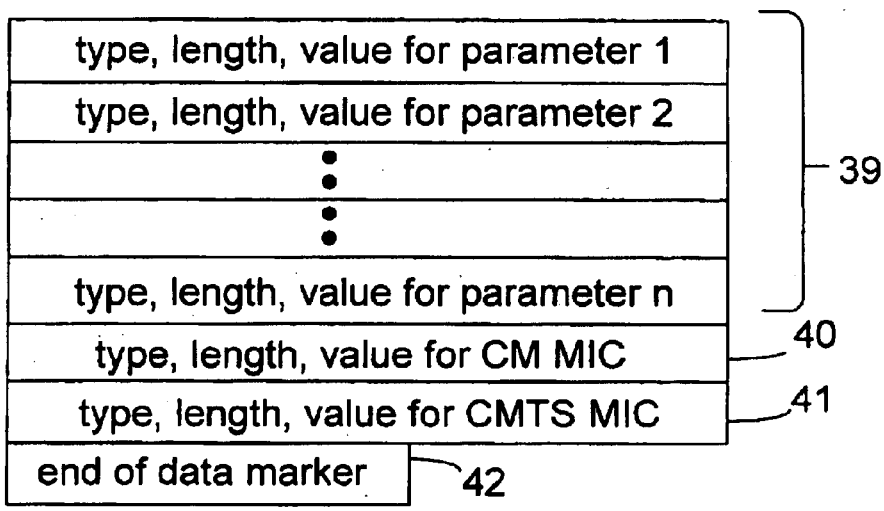
FIG. 5 shows a structure of a configuration file according to one embodiment of the invention.

Once the configuration information has been retrieved, smart TFTP server 31 generates 305 a configuration file for modem 4. A structure of a configuration file 37 is shown in FIG. 5.

Configuration file 37 includes parameters 39 that correspond to one or more of the foregoing modem configuration settings. It includes a type (i.e., an identity), a length, and a value for each parameter. Configuration file 37 also includes types, lengths, and values for CM MIC ("Message Integrity Checksum") 40 and CMTS MIC 41. These checksum values are calculated based on the configuration settings in file 37. CM MIC 40 is used by modem 4 to ensure that the parameters in configuration file 37 were not altered during transmission from CMTS 6. CMTS MIC 41 is used to authenticate modem 4 to CMTS 6 during its registration. Finally, configuration file 37 includes an end of data marker 42.

Returning to FIG. 3, after the configuration file is generated, smart TFTP server 31 provides 306 the configuration file to modem 4 using standard TFTP protocol. Upon receipt, modem 4 configures 307 itself in accordance with the configuration file settings. Alternatively, modem 4 may provide the configuration file to processor 12 which then configures the modem based on the configuration file settings.

Other embodiments of the invention are within the scope of the following claims. For example, the processes of FIGS. 3 and 4 may be implemented by code running on processor 24 in router 19. Also, although the invention is described in the context of a DOCSIS-compliant cable modem and CMTS, it can be used with any type of communication device that receives a configuration file from a central location and that require reliable authentication. Depending upon the device, different (in terms of both content and structure) configuration parameters than those above may be used.

What is claimed is:

1. A method of providing a configuration file to communication device over a network, comprising:
   receiving identification information for the communication device in response to the communication device connecting to the network or re-initializing;
   retrieving configuration information from a database based on the identification information;
   generating a configuration file from the configuration information; and
   providing the configuration file to the communication device.

2. The method according to claim 1, further comprising receiving a request for a configuration file along with the identification information;
   wherein the retrieving, generating and providing are performed in response to the request.

3. The method according to claim 1, wherein the identification information comprises a network address.

4. The method according to claim 3, further comprising:
   receiving a request along with the identification information; and
   determining if the request is authentic;
   wherein the providing provides the configuration file to the communication device if the request is determined to be authentic.

5. The method according to claim 1, wherein the receiving further comprises:
   receiving a request from the communication device;
   querying the communication device for authentication information in response to the request, the authentication information being used for verification of the request; and
   receiving the authentication information in response to the querying.

6. The method according to claim 5, further comprising determining if the request is authentic based on the authentication information;
   wherein the providing provides the configuration file to the communication device if the request is determined to be authentic.

7. The method according to claim 6, wherein the authentication information comprises a body and a digital signature that is encrypted using a private key; and
   wherein the determining comprises:
      decrypting the digital signature using a public key corresponding to the private key;
      generating a hash value of the body; and
      comparing the hash value to the decrypted digital signature.

8. The method according to claim 1, wherein the communication device comprises a cable modem.

9. A method of providing a configuration file to a cable modem over a network, comprising:
   receiving identification information for the cable modem and a request for a configuration file that originated from the cable modem in response to the communication device connecting to the network or re-initializing; and
   determining whether the request is authentic using the identification information;
   wherein, if the request is determined to be authentic, the method further comprises:
      retrieving configuration information from a database in response to the request;
      generating a configuration file from the configuration information; and
      providing the configuration file to the cable modem.

10. A method of providing a configuration file to a communication device over a network, comprising:
    receiving a request for a configuration file from the communication device in response to the communication device connecting to the network or re-initializing;
    determining if the request is authentic; and
    providing the configuration file to the communication device if the request is determined to be authentic.

11. The method according to claim 10, further comprising receiving a certificate from the communication device;
    wherein the determining determines if the request is authentic based on the certificate.

12. The method according to claim 11, wherein the certificate includes a body and a digital signature that is encrypted using a private key; and
    wherein the determining comprises:
       decrypting the digital signature using a public key corresponding to the private key;
       generating a hash value of the body; and
       comparing the hash value to the digital signature.

13. The method according to claim 10, wherein the communication device comprises a cable modem.

14. An apparatus which provides a configuration file to a communication device over a network, comprising:
    a memory which stores executable code and a database that includes configuration information; and
    a processor which executes the code (i) to receive identification information for the communication device in response to the communication device connecting to the network or re-initializing, (ii) to retrieve configuration information from the database based on the identification information, (iii) to generate a configuration file from the configuration information, and (iv) to provide the configuration file to the communication device.

15. The apparatus according to claim 14, wherein the processor (i) receives a request from the communication device, (ii) determines if the request is authentic, and (iii) provides the configuration file to the communication device if the request is determined to be authentic.

16. The apparatus according to claim 15, wherein:
    the processor receives a certificate from the communication device; and
    determines if the request is authentic based on the certificate.

17. The apparatus according to claim 16, wherein the certificate comprises an ITU X.509 certificate.

18. The apparatus according to claim 16, wherein:
    the certificate comprises a body and digital signature that is encrypted using a private key; and
    the determining performed by the processor comprises (i) decrypting the digital signature using a public key corresponding to the private key, (ii) generating a hash value of the body, and (iii) comparing the hash value to the decrypted digital signature.

19. The apparatus according to claim 14, wherein the configuration information comprises a parameter specifying an amount of bandwidth available to the communication device.

20. The apparatus according to claim 14, which resides in a cable modem termination system (CMTS) that provides an interface between a broadband network and an external network, wherein the communication device comprises a cable modem.

21. An apparatus which provides a configuration file to a communication device over a network, comprising:
  a memory which stores executable code and a database that includes configuration information; and
  a processor which executes the code so as (i) to receive a request for a configuration file from the communication device in response to the communication device connecting to the network or re-initializing, (ii) to determine if the request is authentic, and (iii) to provide the configuration file to the communication device if the request is determined to be authentic.

22. The apparatus according to claim 21, wherein the processor receives a certificate from the communication device and determines if the request is authentic based on the certificate.

23. The apparatus according to claim 22, wherein the certificate comprises an ITU X.509 certificate.

24. The apparatus according to claim 22, wherein
  the certificate comprises a body and a digital signature that is encrypted using a private key; and
  the processor determines if the request is authentic by (i) decrypting the digital signature using a public key corresponding to the private key, (ii) generating a hash value of the body, and (iii) comparing the hash value to the digital signature.

25. An article comprising a computer-readable medium encoded with a computer program that comprises instructions to:
  receive identification information for a communication device over a network;
  retrieve configuration information from a database based on the identification information in response to the communication device connecting to the network or re-initializing;
  generate a configuration file from the configuration information; and
  provide the configuration file to the communication device.

26. The article according to claim 25, further comprising instructions to:
  receive a request from the communication device; and
  determine if the request is authentic;
  wherein the providing provides the configuration file to the communication device if the request is determined to be authentic.

27. The article according to claim 26, further comprising instructions to receive a certificate from the communication device;
  wherein the determining determines if the request is authentic based on the certificate.

28. The article according to claim 27, wherein the certificate comprises an ITU X.509 certificate.

29. An article comprising a computer-readable medium encoded with a computer program that comprises instructions to:
  receive a request for a configuration file from a communication device in response to the communication device connecting to the network or re-initializing;
  determine if the request is authentic; and
  provide the configuration file to the communication device if the request is determined to be authentic.

30. A network system comprising:
  a cable modem which outputs identification information and a request for a configuration file; and
  a cable modem termination system (CMTS) which (i) receives the identification information and the request in response to the communication device connecting to the network or re-initializing, and (ii) determines if the request is authentic;
  wherein, if the request is determined to be authentic, the CMTS (iii) retrieves configuration information from a database based on the identification information, (iv) generates a configuration file from the configuration information, and (v) provides the configuration file to the cable modem.

* * * * *